(12) United States Patent
Shen

(10) Patent No.: US 11,805,317 B2
(45) Date of Patent: Oct. 31, 2023

(54) METHOD AND ELECTRONIC DEVICE FOR IMAGE PROCESSING

(71) Applicant: VIVO MOBILE COMMUNICATION CO., LTD., Guangdong (CN)

(72) Inventor: Jiancheng Shen, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/851,216

(22) Filed: Jun. 28, 2022

(65) Prior Publication Data
US 2022/0329733 A1  Oct. 13, 2022

Related U.S. Application Data

(63) Continuation of application No. PCT/CN2020/140184, filed on Dec. 28, 2020.

(30) Foreign Application Priority Data

Dec. 31, 2019 (CN) .......................... 201911423482.0

(51) Int. Cl.
 *H04N 23/68* (2023.01)
 *H04N 23/62* (2023.01)
 *H04N 23/63* (2023.01)

(52) U.S. Cl.
 CPC ........... *H04N 23/683* (2023.01); *H04N 23/62* (2023.01); *H04N 23/632* (2023.01); *H04N 23/687* (2023.01)

(58) Field of Classification Search
None
See application file for complete search history.

(56) References Cited

U.S. PATENT DOCUMENTS

| 10,270,929 B2 * | 4/2019 | Kosaka | H04N 1/19594 |
| 2007/0236570 A1 * | 10/2007 | Sun | G08B 13/19643 |
| | | | 348/169 |
| 2013/0057713 A1 * | 3/2013 | Khawand | H04N 23/80 |
| | | | 348/208.1 |

(Continued)

FOREIGN PATENT DOCUMENTS

| CN | 101572775 A | 11/2009 |
| CN | 109190612 A | 1/2019 |

(Continued)

*Primary Examiner* — Cynthia Segura
(74) *Attorney, Agent, or Firm* — Price Heneveld LLP

(57) ABSTRACT

An image processing method and an electronic device. The method includes: in a case that the electronic device is in a first movement state, capturing a first image through the first camera, where the first camera moves relative to the body; displaying the first image on a shooting preview interface; and in a case that the electronic device changes from the first movement state to a stationary state, processing a second image and updating the first image on the shooting preview interface to the processed second image, where the second image is an image captured by the second camera in a case that the electronic device is in the stationary state, and the second camera is stationary relative to the body. The embodiments of the present disclosure are applied to a process of processing an image when the electronic device changes from a movement state to a stationary state.

15 Claims, 6 Drawing Sheets

---

When the electronic device is in a first movement state, the electronic device captures a first image through a first camera — 201

The electronic device displays the first image on a shooting preview interface — 202

When the electronic device changes from the first movement state to a stationary state, the electronic device processes a second image and updates the first image on the shooting preview interface to the processed second image — 203

(56) References Cited

U.S. PATENT DOCUMENTS

| | | | |
|---|---|---|---|
| 2015/0181006 A1* | 6/2015 | Li | H04N 13/239 |
| | | | 455/575.1 |
| 2017/0124710 A1 | 5/2017 | Kwon et al. | |
| 2019/0272647 A1* | 9/2019 | Im | G06T 7/292 |
| 2019/0356906 A1 | 11/2019 | Handa et al. | |

FOREIGN PATENT DOCUMENTS

| | | |
|---|---|---|
| CN | 109275358 A | 1/2019 |
| CN | 110233969 A | 9/2019 |
| CN | 111147754 A | 5/2020 |
| WO | 2019237981 A1 | 12/2019 |

\* cited by examiner

METHOD AND ELECTRONIC DEVICE FOR IMAGE PROCESSING

CROSS-REFERENCE TO RELATED APPLICATIONS

This application is a continuation application of International Application No. PCT/CN2020/140184 filed on Dec. 28, 2020, which claims priority to Chinese Patent Application No. 201911423482.0, filed in China on Dec. 31, 2019, which are incorporated herein by reference in their entireties.

TECHNICAL FIELD

Embodiments of the present disclosure relate to the field of communications technologies, and in particular, to an image processing method and an electronic device.

BACKGROUND

Currently, during shooting, when an electronic device moves, a camera of the electronic device also moves accordingly. As a result, an image shot by the electronic device may be blurred. Generally, the electronic device can first determine a shift of the camera according to the displacement of the electronic device, and then drive the camera to move in a reverse direction according to the shift, to avoid blurring of a shot image caused by the movement of the electronic device.

However, in the above method, after the electronic device stops moving, the electronic device needs to drive the camera to reset (that is, drive the camera to return to an initial position of the camera). As a result, the image shot by the camera also shifts, which causes ghosting in the shot image and leads to a poor shooting effect of the electronic device.

SUMMARY

Embodiments of the present disclosure provide an image processing method and an electronic device.

According to a first aspect of the embodiments of the present disclosure, an image processing method is provided, applied to an electronic device. The electronic device includes: a body, a first camera, and a second camera. The image processing method includes: in a case that the electronic device is in a first movement state, capturing a first image through the first camera, where the first camera moves relative to the body; displaying the first image on a shooting preview interface; and in a case that the electronic device changes from the first movement state to a stationary state, processing a second image and updating the first image on the shooting preview interface to the processed second image, where the second image is an image captured by the second camera in a case that the electronic device is in the stationary state, and the second camera is stationary relative to the body.

According to a second aspect of the embodiments of the present disclosure, an electronic device is provided. The electronic device includes: a body, a first camera, and a second camera. The electronic device further includes: a capturing module, a display module, a processing module, and an update module. The capturing module is configured to: in a case that the electronic device is in a first movement state, capture a first image through the first camera, where the first camera moves relative to the body. The display module is configured to display, on a shooting preview interface, the first image captured by the capturing module. The processing module is configured to: in a case that the electronic device changes from the first movement state to a stationary state, process a second image captured by the capturing module. The update module is configured to update the first image on the shooting preview interface captured by the capturing module to the second image processed by the processing module, where the second image is an image captured by the second camera in a case that the electronic device is in the stationary state, and the second camera is stationary relative to the body.

According to a third aspect of the embodiments of the present disclosure, an electronic device is provided. The electronic device includes a processor, a memory, and a computer program stored in the memory and executable on the processor, where when the computer program is executed by the processor, steps of the image processing method in the first aspect are implemented.

According to a fourth aspect of the embodiments of the present disclosure, a computer-readable storage medium is provided. The computer-readable storage medium stores a computer program. When the computer program is executed by a processor, steps of the image processing method in the first aspect are implemented.

In the embodiments of the present disclosure, when the electronic device is in the first movement state, the electronic device can capture the first image through the first camera that moves relative to the body, and when the electronic device changes from the first movement state to the stationary state, the electronic device may process the second image (that is, the image captured by the second camera that is stationary relative to the body in a case that the electronic device is in the stationary state), to display the processed second image on the shooting preview interface. When the electronic device changes from the first movement state to the stationary state, instead of capturing an image by the first camera that moves relative to the body, the electronic device can process the second image captured by the second camera that is stationary relative to the body, and display the processed second image on the shooting preview interface. Therefore, ghosting in the captured image can be avoided, to improve the capturing effect of the electronic device.

DETAILED DESCRIPTION OF EMBODIMENTS

Figure 1:
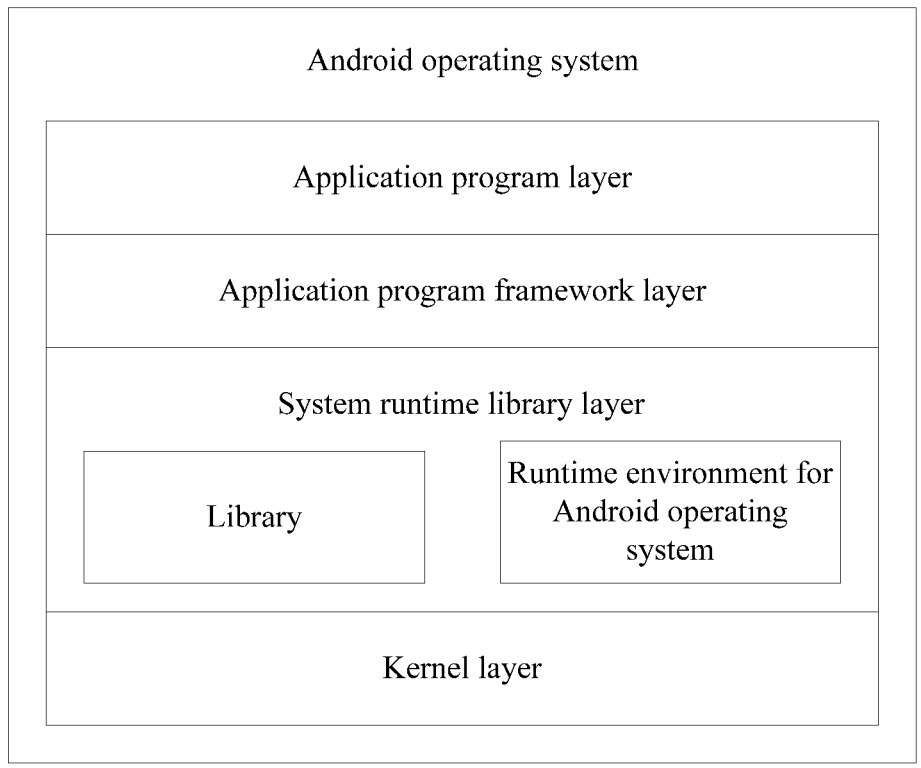
FIG. 1 is a schematic architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the embodiments of the present disclosure, the terms such as "first" and "second" are used to distinguish between different objects, but are not used to describe a particular sequence of the objects. For example, a first image, a second image, and the like are used to distinguish between different images, but are not used to describe a particular sequence of the images.

In the description of the embodiments of the present disclosure, unless otherwise specified, the meaning of "a plurality of" means two or more. For example, a plurality of elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure provide an image processing method and an electronic device. When the electronic device changes from the first movement state to the stationary state, instead of capturing an image by the first camera that moves relative to the body, the electronic device can process the second image captured by the second camera that is stationary relative to the body, and display the processed second image on the shooting preview interface. Therefore, ghosting in the captured image can be avoided, to improve the capturing effect of the electronic device.

The image processing method and the electronic device provided by the embodiments of the present disclosure can be applied to a process of image processing performed by the electronic device. Optionally, the image processing method and the electronic device can be applied to a process of processing an image when the electronic device changes from a movement state to a stationary state.

The electronic device in the embodiments of the present disclosure may be an electronic device with an operating system. The operating system may be an Android (Android) operating system, or may be an iOS operating system or other possible operating systems, which is not specifically limited in the embodiments of the present disclosure.

The Android operating system is used as an example below, to describe an applicable software environment of the image processing method provided in the embodiments of the present disclosure.

FIG. 1 is a schematic architectural diagram of a possible Android operating system according to an embodiment of the present disclosure. In FIG. 1, an architecture of the Android operating system includes four layers: an application program layer, an application program framework layer, a system runtime library layer, and a kernel layer (which may be optionally a Linux kernel layer).

The application program layer includes various application programs (including a system application program and a third-party application program) in the Android operating system.

The application program framework layer is an application program framework, and a developer may develop some application programs based on the application program framework layer while conforming to a rule of developing the application program framework.

The system runtime library layer includes a library (also referred to as a system library) and a runtime environment of the Android operating system. The library mainly provides various resources required for the Android operating system. The runtime environment of the Android operating system is used to provide the Android operating system with a software environment.

The kernel layer is an operating system layer of the Android operating system, and is the lowest layer of software levels of the Android operating system. The kernel layer provides the Android operating system with a core system service and a hardware-related driver based on the Linux kernel.

The Android operating system is used as an example. In the embodiments of the present disclosure, based on the system architecture of the Android operating system shown in FIG. 1, developers may develop a software program that implements the image processing method provided in the embodiments of the present disclosure, so that the image processing method may be performed based on the Android operating system shown in FIG. 1. That is, a processor or the electronic device may run the software program in the Android operating system to implement the image processing method provided in the embodiments of the present disclosure.

The electronic device in the embodiments of the present disclosure may be a mobile electronic device or a non-mobile electronic device. For example, the mobile electronic device may be a mobile phone, a tablet computer, a laptop computer, a palmtop computer, an in-vehicle terminal, a wearable device, an ultra-mobile personal computer (ultra-mobile personal computer, UMPC), a netbook, or a personal digital assistant (personal digital assistant, PDA). The non-mobile electronic device may be a personal computer (personal computer, PC), a television (television, TV), an automated teller machine or a self-service machine. This is not specifically limited in the embodiments of the present disclosure.

The image processing method and the electronic device provided in the embodiments of the present disclosure are described in detail below through specific embodiments and application scenarios thereof with reference to the accompanying drawings.

It should be noted that the electronic device in the embodiments of the present disclosure may include at least two cameras. In the following embodiments, for example, the electronic device includes only two cameras (for example, a first camera and a second camera), to illustrate the image processing method provided in the embodiments of the present disclosure. Specific implementations of the embodiments of the present disclosure are only illustrative, rather than restrictive, and the present disclosure is not limited to the following specific implementations. Those of ordinary skill in the art may make many variations under the inspiration of the present disclosure without departing from the purpose of the present application and the protection scope of claims. These all fall within the protection of the present application.

In the embodiments of the present disclosure, when a user uses an electronic device to shoot, the electronic device can capture images through a motion camera of the electronic device. If the electronic device is in a movement state (for example, the user moves while holding the electronic device), the electronic device can perform image compensation processing on the captured images, that is, the electronic device can determine a shift of the motion camera according to a displacement of the movement of the electronic device, and then drive the motion camera to move in a reverse direction according to the shift, to compensate for the shift of the motion camera. In this way, image compensation processing is performed on the captured images, so that the images obtained after the image compensation processing are less likely to be blurred. If the electronic device changes from the movement state to a stationary state (for example, the user stops movement while holding the electronic device), the electronic device may capture images through a fixed camera (pixels in the image captured by the fixed camera and pixels in the image captured by the motion camera have a shift), and process the images captured by the fixed camera, so that content of the processed images captured by the fixed camera is the same as that of the image captured by the motion camera (that is, the pixels in the processed image captured by the fixed camera and the pixels in the image captured by the motion camera do not have a shift).

Figure 2:
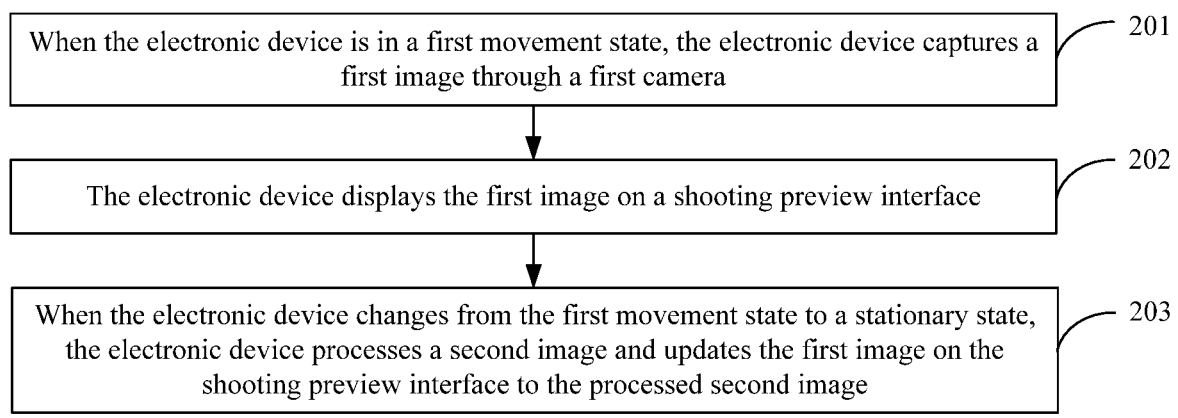
FIG. 2 is a schematic diagram 1 of an image processing method according to an embodiment of the present disclosure.

The embodiments of the present disclosure provide an image processing method. FIG. 2 is a flowchart of an image processing method according to an embodiment of the present disclosure. The method may be applied to an electronic device with the Android operating system shown in FIG. 1. As shown in FIG. 2, the image processing method provided in the embodiments of the present disclosure may include the following step 201 to step 203.

Step 201: In a case that the electronic device is in a first movement state, the electronic device captures a first image through a first camera.

In the embodiments of the present disclosure, the electronic device includes a body, a first camera, and a second camera, and the first camera moves relative to the body.

In the embodiments of the present disclosure, when the electronic device displays a shooting preview interface (for example, an interface of an application program with a shooting function (for example, a camera application program)), the electronic device can turn on the first camera, and when the electronic device is in the first movement state (for example, a user moves while holding the electronic device), capture the first image through the first camera.

Optionally, in the embodiments of the present disclosure, the first movement state may be a state in which the electronic device moves at a first speed in a first direction.

Optionally, in the embodiments of the present disclosure, the electronic device may detect whether the electronic device is in the first movement state through a motion sensor of the electronic device.

Optionally, in the embodiments of the present disclosure, the motion sensor may optionally be a gyroscope; and the first camera may optionally be a motion camera.

It should be noted that the "motion camera" can be understood as a camera with an optical image stabilization function. It can be understood that when the electronic device moves, the electronic device can determine a shift of the camera according to a displacement of the movement of the electronic device, so that the electronic device can drive the camera to move by the shift in a reverse direction of a movement direction of the electronic device, to avoid blurring of a captured image caused by the shift of the camera.

Optionally, in the embodiments of the present disclosure, when the electronic device is in the first movement state, the first camera moves in the reverse direction of the movement direction of the electronic device, that is, the first camera moves relative to the body.

Figure 3:
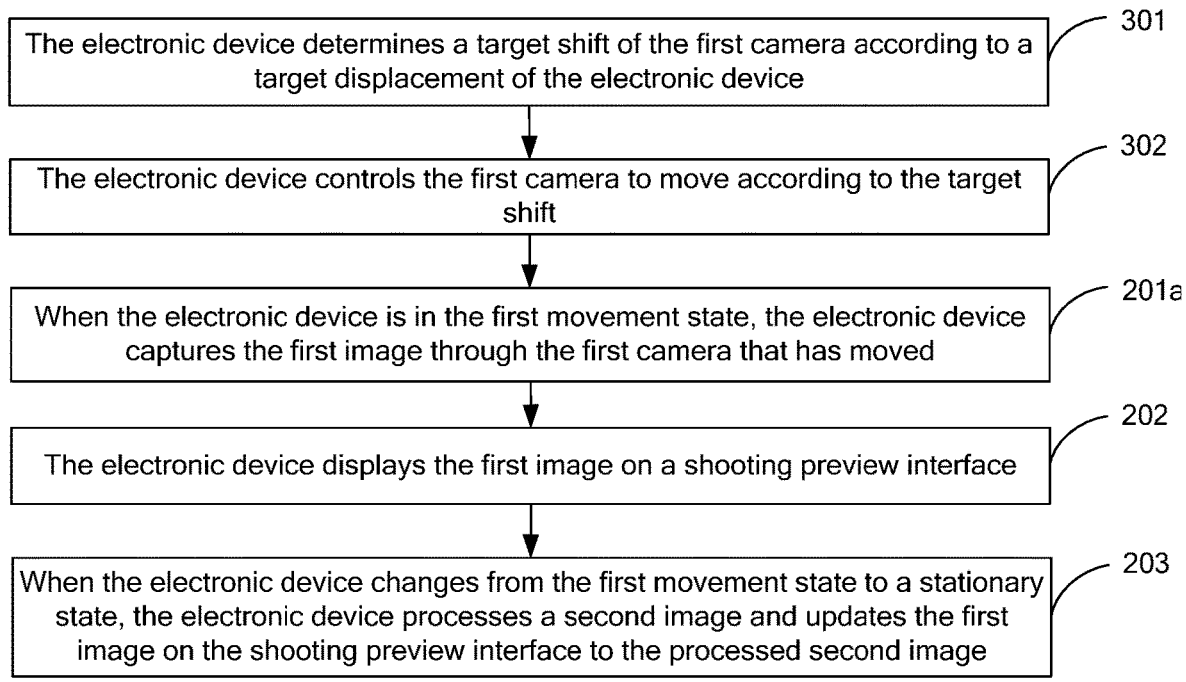
FIG. 3 is a schematic diagram 2 of an image processing method according to an embodiment of the present disclosure.

Optionally, in the embodiments of the present disclosure, with reference to FIG. 2, as shown in FIG. 3, before step 201, the image processing method provided by the embodiments of the present disclosure may further include the following step 301 and step 302. In addition, step 201 can be optionally implemented through the following step 201a.

Step 301: The electronic device determines a target shift of the first camera according to a target displacement of the electronic device.

Optionally, in the embodiments of the present disclosure, the electronic device may obtain the target displacement of the electronic device through a motion sensor, and determine the target shift of the first camera according to the target displacement.

Optionally, in the embodiments of the present disclosure, the electronic device may determine the target displacement of the electronic device as the target shift of the first camera.

Step 302: The electronic device controls the first camera to move according to the target shift.

Optionally, in the embodiments of the present disclosure, the electronic device may control the first camera to move by the target shift in a reverse direction of the movement direction of the electronic device.

It can be understood that the electronic device can control the first camera to move according to the target shift, to compensate for the target shift by which the first camera shifts because the electronic device moves, to avoid blurring of the captured images.

Step 201a: When the electronic device is in the first movement state, the electronic device captures the first image through the first camera that has moved.

In the embodiments of the present disclosure, the electronic device may capture the first image through the first camera that has moved, that is, the first image is an image obtained after image compensation processing.

In the embodiments of the present disclosure, the electronic device can control the first camera to move by the target shift according to the target displacement of the electronic device, to compensate for the target shift by which the first camera shifts because the electronic device moves. Therefore, this can avoid blurring of the captured images to improve the shooting effect of the electronic device.

Step 202: The electronic device displays the first image on a shooting preview interface.

Optionally, in the embodiments of the present disclosure, when the electronic device is in the first movement state, the electronic device can capture the first image through the first camera, to display, on the shooting preview interface, the first image obtained after image compensation processing.

It can be understood that when the electronic device is in the first movement state, the electronic device can display, on the shooting preview interface, the first image obtained after image compensation processing, so that the user can perform shooting input on the shooting preview interface, to obtain a shot image that is less likely to be blurred.

Step 203: In a case that the electronic device changes from the first movement state to a stationary state, the electronic device processes a second image and updates the first image on the shooting preview interface to the processed second image.

In the embodiments of the present disclosure, the second image is an image captured by the second camera in a case that the electronic device is in the stationary state, and the second camera is stationary relative to the body.

It should be noted that the "stationary state" can be understood as a state in which the moving speed of the electronic device is less than or equal to a preset threshold.

Optionally, in the embodiments of the present disclosure, the electronic device may detect whether the electronic device changes from the first movement state to the stationary state according to a motion sensor.

Optionally, in the embodiments of the present disclosure, the second camera may optionally be a fixed camera.

It should be noted that the "fixed camera" can be understood as a camera fixedly connected to the body.

Optionally, in the embodiments of the present disclosure, when the electronic device changes from the first movement state to the stationary state, the second camera may change from the first movement state to the stationary state along with the electronic device, that is, the second camera is stationary relative to the body.

Optionally, in the embodiments of the present disclosure, when the electronic device is in the first movement state, the electronic device can turn on the second camera while capturing the first image through the first camera, so that the second camera can be used to capture an image in real time. In this way, when the electronic device changes from the first movement state to the stationary state (that is, a moment at which the electronic device changes from the first movement state to the stationary state), the second image is captured by the second camera.

Optionally, in the embodiments of the present disclosure, when the electronic device changes from the first movement state to the stationary state, the electronic device may turn on the second camera to capture the second image through the second camera.

In the embodiments of the present disclosure, the pixels in the second image and the pixels in the first image have a shift. When the electronic device is in the first movement state, the electronic device can use the first camera to perform image compensation processing on the captured first image, so that the first image obtained after the image compensation processing is less likely to be blurred. When the electronic device changes from the first movement state to the stationary state, the second camera also changes from the first movement state to the stationary state, that is, the second image is not blurred. In this way, the electronic device can process the second image, so that the pixels in the second image and the pixels in the first image have no shift, that is, the shooting angle of the second image is the same as that of the first image.

Optionally, in the embodiments of the present disclosure, the angle of view of the second camera is greater than that of the first camera.

In the embodiments of the present disclosure, the second camera and the first camera are disposed at different positions on the body, so that shooting angles of the second image captured by the second camera and the first image captured by the first camera are different. The electronic device can process (perform pseudo image processing on) the second image, so that the shooting angle of the processed second image is the same as that of the first image (that is, the content of the processed second image is the same as that of the first image).

It should be noted that the "pseudo image processing" can be understood as: the second image is processed, so that the shooting angle of the processed second image is the same as that of the first image, that is, the processed second image can "pretend" to be the first image.

It can be understood that when the electronic device changes from the first movement state to the stationary state, the second camera is also in the stationary state. Therefore, the second image captured by the electronic device through the second camera has no ghosting, to avoid ghosting in the captured image.

It should be noted that processing of the second image by the electronic device is optionally described in the following embodiments, and is not described in detail herein.

The embodiments of the present disclosure provide an image processing method. The electronic device can capture the first image through the first camera that moves relative to the body, and when the electronic device changes from the first movement state to the stationary state, the electronic device may process the second image (that is, the image captured by the second camera that is stationary relative to the body in a case that the electronic device is in the stationary state), to display the processed second image on the shooting preview interface. When the electronic device changes from the first movement state to the stationary state, instead of capturing an image by the first camera that moves relative to the body, the electronic device can process the second image captured by the second camera that is stationary relative to the body, and display the processed second image on the shooting preview interface. Therefore, ghosting in the captured image can be avoided, to improve the capturing effect of the electronic device.

It can be understood that after the electronic device processes the second image, the shooting angle (the image angle) of the processed second image is the same as that of the first image. Therefore, the shooting angle of shooting observation of the user is not affected while the shooting effect of the electronic device can be improved.

Figure 4:
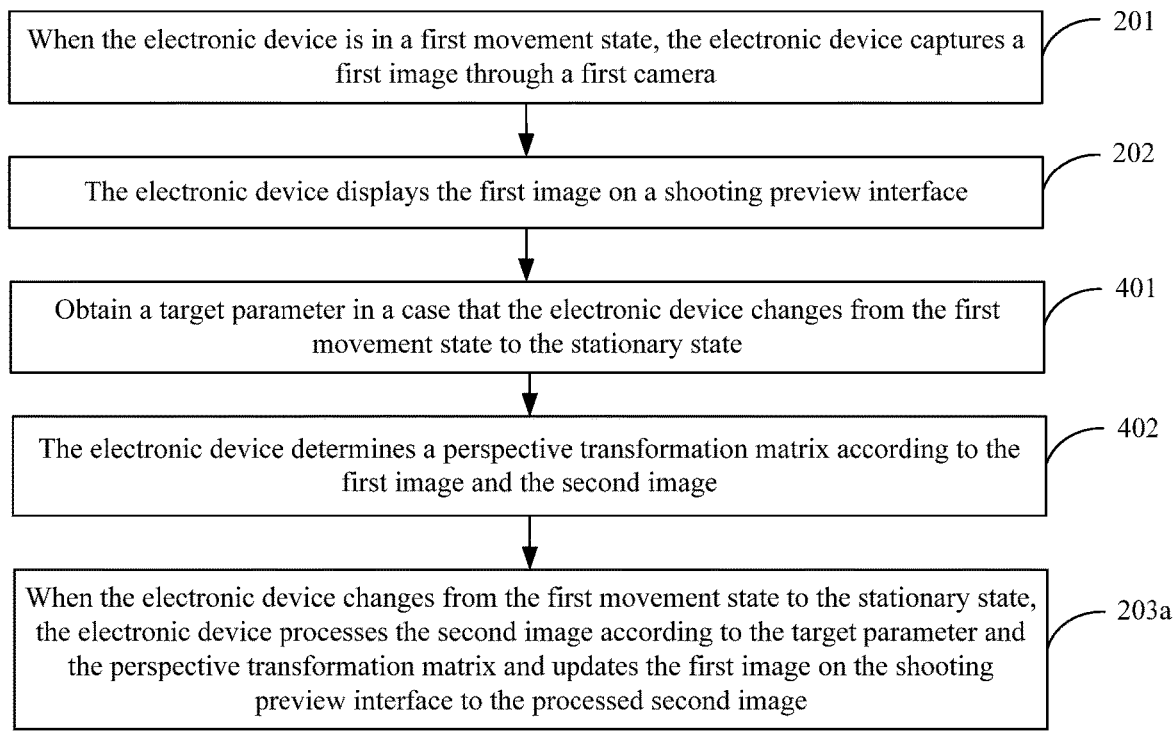
FIG. 4 is a schematic diagram 3 of an image processing method according to an embodiment of the present disclosure.

Optionally, in the embodiments of the present disclosure, with reference to FIG. 2, as shown in FIG. 4, before step 203 "the electronic device processes the second image", the image processing method provided in the embodiments of the present disclosure may also include the following step 401 and step 402. In addition, step 203 can be optionally implemented through the following step 203a.

Step 401: Obtain a target parameter in a case that the electronic device changes from the first movement state to the stationary state.

In the embodiments of the present disclosure, the target parameter is used to indicate a position and posture relationship of the second camera relative to the first camera.

It should be noted that the "position and posture relationship" can be understood as a position relationship, such as a distance relationship and an angle relationship.

Optionally, in the embodiments of the present disclosure, when the electronic device changes from the first movement state to the stationary state, the electronic device may detect the first camera and the second camera respectively to obtain a parameter of the first camera and a parameter of the second camera. Therefore, the electronic device can obtain the target parameter according to the parameter of the first camera and the parameter of the second camera.

Optionally, in the embodiments of the present disclosure, step 401 may be optionally implemented through the following step 401a and step 401b.

Step 401a: The electronic device obtains a first parameter and a second parameter.

In the embodiments of the present disclosure, the first parameter is an internal parameter and an external parameter of the first camera, and the second parameter is an internal parameter and an external parameter of the second camera.

It should be noted that an "internal parameter of a camera" can be understood as: a parameter related to the characteristic of the camera, such as a focal length parameter of the camera or a pixel parameter of the camera. An "external parameter of a camera" can be understood as: a parameter of the camera in a geographic coordinate system, such as a position parameter (for example, coordinate information) of the camera in the geographic coordinate system or an angle parameter of the camera in the geographic coordinate system.

Optionally, in the embodiments of the present disclosure, the electronic device may use a camera calibration algorithm to detect the first camera and the second camera respectively, to obtain the first parameter and the second parameter.

It should be noted that, for specific description of the camera calibration algorithm, refer to the description in the related art. This is not described in detail in the embodiments of the present disclosure.

Step 401b: The electronic device determines the target parameter according to the first parameter and the second parameter.

Optionally, in the embodiments of the present disclosure, the electronic device may calculate a difference between the internal parameter of the first camera and the internal parameter of the second camera (hereinafter referred to as a first difference), and a difference between the external parameter of the first camera and the external parameter of the second camera (hereinafter referred to as a second difference), and determine the target parameter (that is, relative position and posture information) according to the first difference and the second difference.

It should be noted that the "relative position and posture information" can be understood as: position information of the second camera relative to the first camera (for example, distance information of the second camera relative to the first camera and angle information of the second camera relative to the first camera).

Step 402: The electronic device determines a perspective transformation matrix according to the first image and the second image.

In the embodiments of the present disclosure, the perspective transformation matrix is used to indicate the shift relationship of the second image relative to the first image.

It should be noted that the "shift relationship" can be understood as: a position shift of the pixels in the second image relative to the pixels in the first image.

Optionally, in the embodiments of the present disclosure, the electronic device may first perform image detection on the first image to obtain position information of a plurality of first feature points in the first image, and perform image detection on the second image to obtain position information of a plurality of second feature points. Therefore, the electronic device can determine the perspective transformation matrix (a shift relationship (an image relationship) between the first image and the second image) according to the position information of the plurality of first feature points and the position information of the plurality of second feature points. A first feature point corresponds to a second feature point (that is, an $i^{th}$ pixel in the first image corresponds to an $i^{th}$ pixel in the second image, and i is a positive integer).

It should be noted that the plurality of first feature points can be understood as some pixels in the first image, and these pixels can reflect contour features of image content in the first image; the plurality of second feature points can be understood as some pixels in the second image, and these pixels can reflect contour features of image content in the first image.

Optionally, in the embodiments of the present disclosure, for each first feature point of the plurality of first feature points, the electronic device may determine a third difference according to position information of a first feature point and position information of a second feature point, to determine a plurality of third differences. The electronic device may determine the perspective transformation matrix according to the plurality of third differences.

It can be understood that the perspective transformation matrix is used to indicate position shifts of the plurality of second feature points in the second image relative to the plurality of first feature points in the first image.

Step 203a: When the electronic device changes from the first movement state to the stationary state, the electronic device processes the second image according to the target parameter and the perspective transformation matrix and updates the first image on the shooting preview interface to the processed second image.

Optionally, in the embodiments of the present disclosure, the electronic device may perform translation processing on all pixels in the second image according to the target parameter and the perspective transformation matrix through a perspective transformation algorithm.

It should be noted that, for specific description of the perspective transformation algorithm, refer to the description in the related art. This is not described in detail in the embodiments of the present disclosure.

It can be understood that the image content (for example, the shooting angle) of the processed second image is the same as (for example, completely consistent with) that (for example, the shooting angle) of the first image.

In the embodiments of the present disclosure, the electronic device may determine a position shift of the position of the second camera relative to the position of the first camera according to the target parameter, and determine a pixel shift of the pixel in the second image captured by the second camera relative to the pixel in the first image captured by the first camera according to the perspective transformation matrix. Therefore, the electronic device can perform translation processing on the pixels in the second image according to the position shift and the pixel shift, to obtain an image with the same shooting angle as that of the first image (that is, an image whose pixels have no shift from pixels of the first image).

In the embodiments of the present disclosure, the electronic device can quickly perform translation processing on all the pixels in the second image according to the target parameter, the first image, and the second image, to obtain the second image with the same shooting angle as that of the first image.

Figure 5:
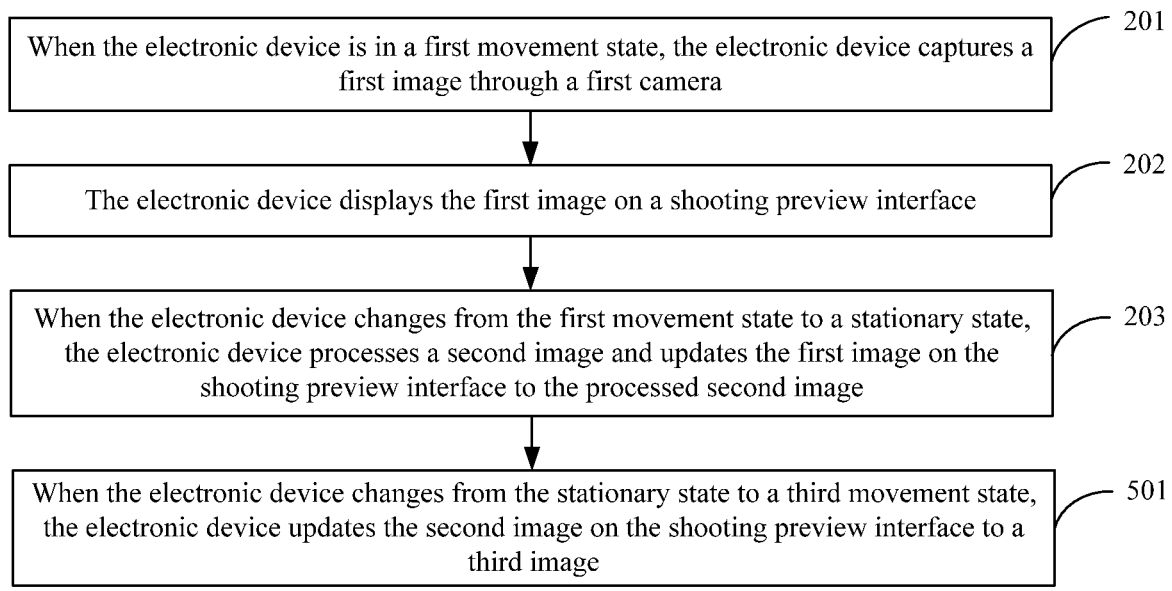
FIG. 5 is a schematic diagram 4 of an image processing method according to an embodiment of the present disclosure.

Optionally, in the embodiments of the present disclosure, with reference to FIG. 2, as shown in FIG. 5, after step 203, the image processing method provided by the embodiments of the present disclosure may further include the following step 501.

Step 501: In a case that the electronic device changes from the stationary state to a second movement state, the electronic device updates the second image on the shooting preview interface to a third image.

In the embodiments of the present disclosure, the third image is an image captured by the first camera in the second movement state.

Optionally, in the embodiments of the present disclosure, the second movement state may be a state in which the electronic device moves at a second speed in a second direction.

Optionally, in the embodiments of the present disclosure, the second direction may be the same as or different from the first direction, and the second speed may be the same as or different from the first speed.

Optionally, in the embodiments of the present disclosure, the electronic device may detect whether the electronic device changes from the stationary state to the second movement state through a motion sensor.

It can be understood that when the electronic device changes from the stationary state to the second movement state, the electronic device can determine a shift of the first camera according to a displacement of the movement of the electronic device, so that the electronic device can drive the first camera to move by the shift in a reverse direction of a movement direction of the electronic device, to avoid blurring of the third image to improve the shooting effect of the electronic device.

In the embodiments of the present disclosure, when the electronic device changes from the stationary state to the second movement state, the electronic device can update the second image on the shooting preview interface to the third image (that is, the image captured by the first camera), to improve the shooting effect of the electronic device.

Figure 6:
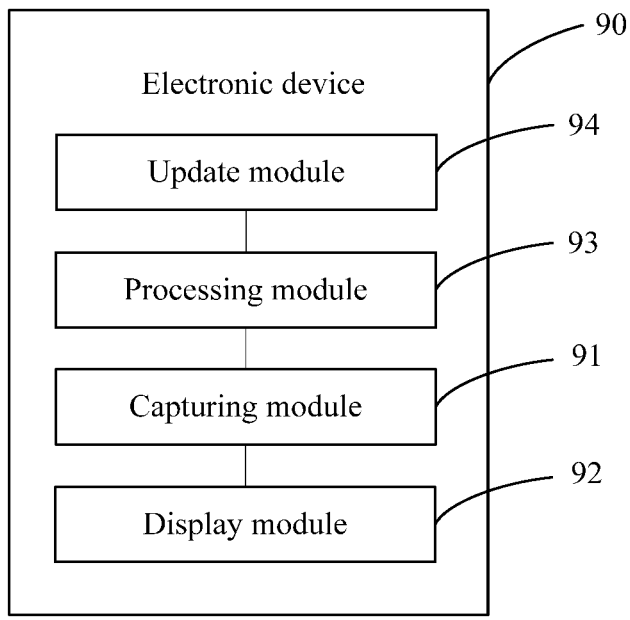
FIG. 6 is a schematic structural diagram 1 of an electronic device according to an embodiment of the present disclosure.

FIG. 6 is a possible schematic structural diagram of an electronic device according to an embodiment of the present disclosure. The electronic device includes: a body, a first camera, and a second camera. As shown in FIG. 6, the electronic device 90 may include: a capturing module 91, a display module 92, a processing module 93, and an update module 94.

The capturing module 91 is configured to: in a case that the electronic device is in a first movement state, capture a first image through the first camera, where the first camera moves relative to the body. The display module 92 is configured to display, on a shooting preview interface, the first image captured by the capturing module 91. The processing module 93 is configured to: in a case that the electronic device changes from the first movement state to a stationary state, process a second image captured by the capturing module 91, where the second image is an image captured by the second camera in a case that the electronic device is in the stationary state, and the second camera is stationary relative to the body. The update module 94 is configured to update the first image on the shooting preview interface captured by the capturing module 91 to the second image processed by the processing module 93.

Figure 7:
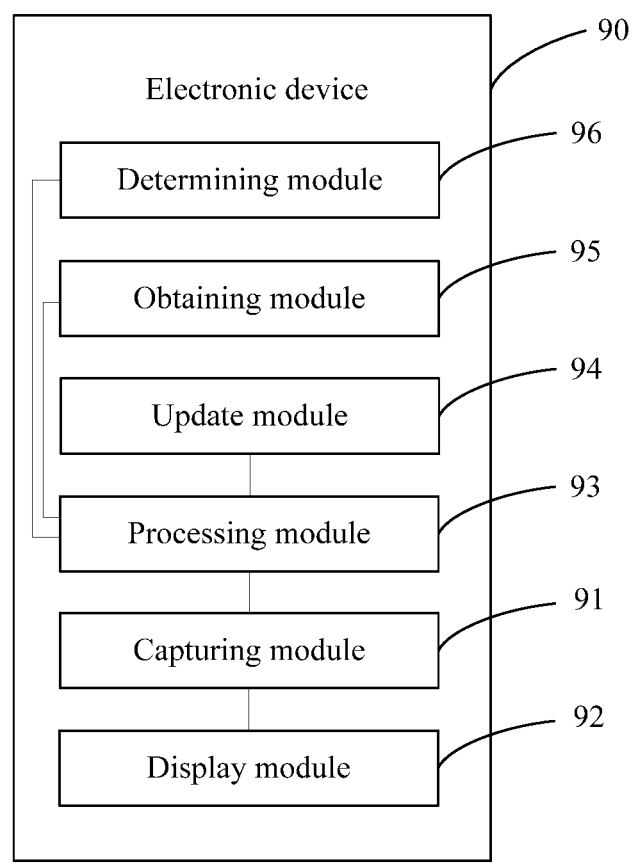
FIG. 7 is a schematic structural diagram 2 of an electronic device according to an embodiment of the present disclosure.

In a possible implementation, with reference to FIG. 6, as shown in FIG. 7, the electronic device 90 provided in the embodiments of the present disclosure may further include: an obtaining module 95 and a determining module 96. The obtaining module 95 is configured to: before the processing module 93 processes the second image, obtain a target parameter, where the target parameter is used to indicate a position and posture relationship of the second camera relative to the first camera. The determining module 96 is configured to determine a perspective transformation matrix according to the first image and the second image, where the perspective transformation matrix is used to indicate a shift relationship of the second image relative to the first image. The processing module 93 is optionally configured to process the second image according to the target parameter and the perspective transformation matrix.

In a possible implementation, the obtaining module 95 is optionally configured to: obtain a first parameter and a second parameter, where the first parameter is an internal parameter and an external parameter of the first camera, and the second parameter is an internal parameter and an external parameter of the second camera; and determine the target parameter based on the first parameter and the second parameter.

Figure 8:
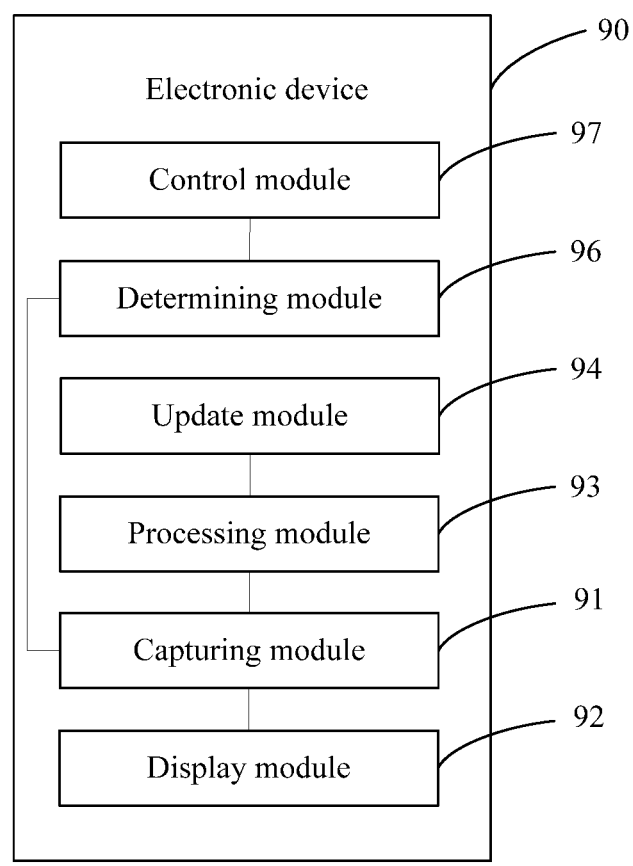
FIG. 8 is a schematic structural diagram 3 of an electronic device according to an embodiment of the present disclosure.

In a possible implementation, with reference to FIG. 6, as shown in FIG. 8, the electronic device 90 provided in the embodiments of the present disclosure may further include: a determining module 96 and a control module 97. The determining module 96 is configured to: before the capturing module 91 captures the first image through the first camera, determine a target shift of the first camera according to a target displacement of the electronic device. The control module 97 is configured to control the first camera to move according to the target shift determined by the determining module 96. The capturing module 91 is optionally configured to capture the first image through the first camera that has moved.

In a possible implementation, the update module 94 is further configured to: after updating the first image on the shooting preview interface to the processed second image, in a case that the electronic device changes from the stationary state to a second movement state, update the second image on the shooting preview interface to a third image, where the third image is an image captured by the first camera in the second movement state.

The electronic device provided in the embodiments of the present disclosure can implement the processes that are implemented by the electronic device in the foregoing method embodiments. To avoid repetition, details are not described herein again.

Embodiments of the present disclosure provide an electronic device. When the electronic device changes from the first movement state to the stationary state, instead of capturing an image by the first camera that moves relative to the body, the electronic device can process the second image captured by the second camera that is stationary relative to the body, and display the processed second image on the shooting preview interface. Therefore, ghosting in the captured image can be avoided, to improve the capturing effect of the electronic device.

Figure 9:
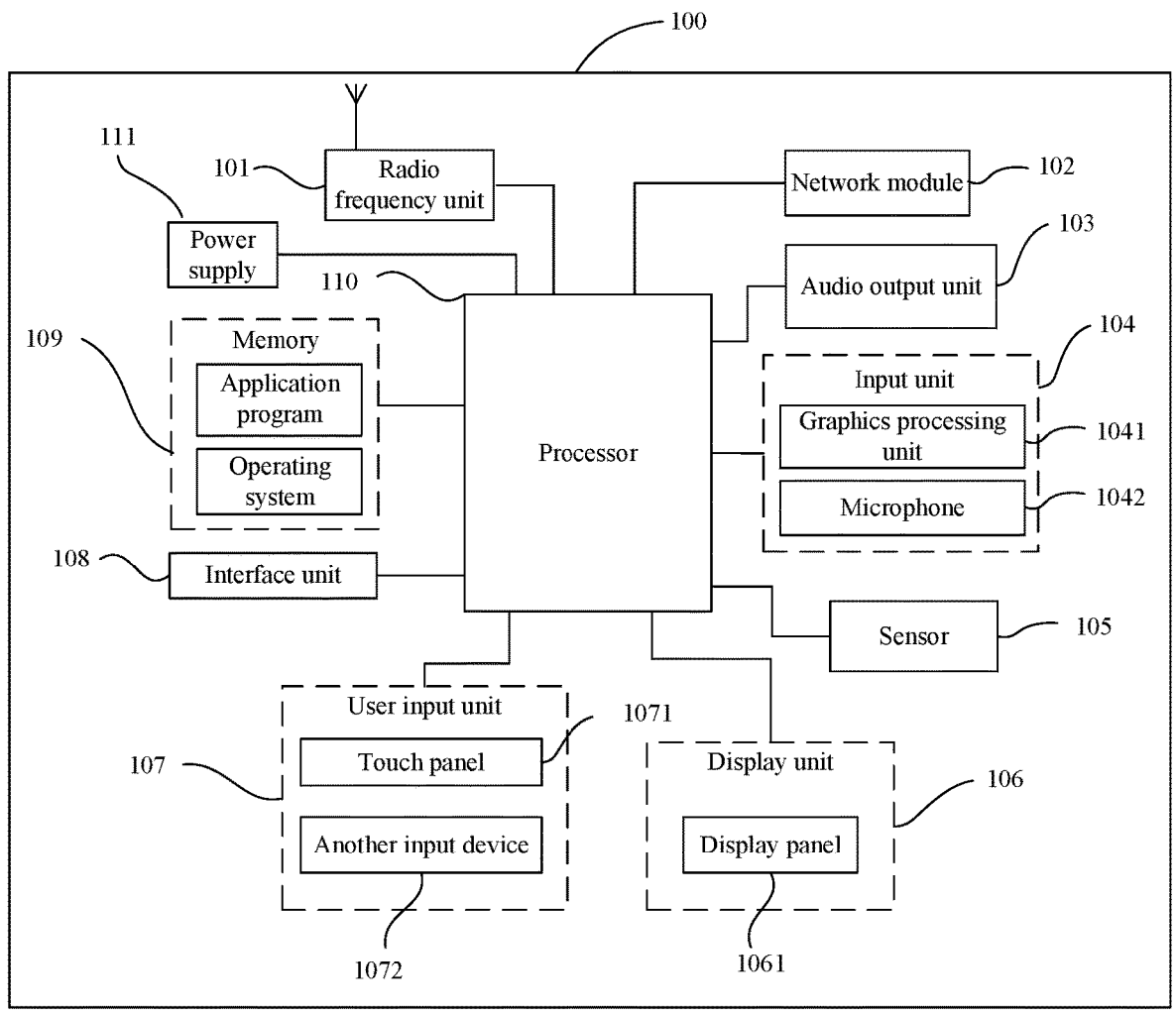
FIG. 9 is a schematic diagram of hardware of an electronic device according to an embodiment of the present disclosure.

FIG. 9 is a schematic diagram of hardware of an electronic device implementing embodiments of the present disclosure. As shown in FIG. 9, the electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components.

It should be understood that a person skilled in the art may understand that the structure of the electronic device shown in FIG. 9 constitutes no limitation on the electronic device. The electronic device may include more or fewer components than those shown in FIG. 9, or a combination of some components, or an arrangement of different components. In the embodiments of the present disclosure, the electronic device includes but is not limited to a mobile phone, a tablet computer, a notebook computer, a palmtop computer, an in-vehicle terminal, a wearable device, a pedometer, and the like.

The processor 110 is configured to: in a case that the electronic device is in a first movement state, capture a first image through the first camera, where the first camera moves relative to the body; control the display unit 106 to display the first image on a shooting preview interface; and in a case that the electronic device changes from the first movement state to a stationary state, process a second image and update the first image on the shooting preview interface to the processed second image, where the second image is an image captured by the second camera in a case that the electronic device is in the stationary state, and the second camera is stationary relative to the body.

Embodiments of the present disclosure provide an electronic device. When the electronic device changes from the first movement state to the stationary state, instead of capturing an image by the first camera that moves relative to the body, the electronic device can process the second image captured by the second camera that is stationary relative to the body, and display the processed second image on the shooting preview interface. Therefore, ghosting in the captured image can be avoided, to improve the capturing effect of the electronic device.

It should be understood that in the embodiments of the present disclosure, the radio frequency unit 101 may be configured to receive and transmit information, or receive and transmit signals during a call. Optionally, the radio frequency unit receives downlink data from a base station, and transmits the downlink data to the processor 110 for processing; and transmits uplink data to the base station. Generally, the radio frequency unit 101 includes, but is not limited to, an antenna, at least one amplifier, a transceiver, a coupler, a low noise amplifier, and a duplexer. In addition, the radio frequency unit 101 may also communicate with a network and other devices through a wireless communication system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal, and output the audio signal as sound. Moreover, the audio output unit 103 can further provide audio output related to a specific function performed the electronic device 100 (for example, call signal receiving sound and message receiving sound). The audio output unit 103 includes a speaker, a buzzer, a telephone receiver, and the like.

The input unit 104 is configured to receive audio or video signals. The input unit 104 may include a graphics processing unit (Graphics Processing Unit, GPU) 1041 and a microphone 1042. The graphics processing unit 1041 processes image data of a static image or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such a sound into audio data. The processed audio data may be converted, in a phone calling mode, into a format that may be transmitted to a mobile communication base station by using the radio frequency unit 101 for output.

The electronic device 100 further includes at least one sensor 105, for example, a light sensor, a motion sensor, and another sensor. Optionally, the light sensor includes an ambient light sensor and a proximity sensor. The ambient light sensor may adjust brightness of a display panel 1061 according to ambient light brightness. The proximity sensor may switch off the display panel 1061 and/or backlight when the electronic device 100 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 106 is configured to display information entered by the user or information provided for the user. The display unit 106 may include the display panel 1061, and the display panel 1061 may be configured in a form of a liquid crystal display (Liquid Crystal Display, LCD), an organic light-emitting diode (Organic Light-Emitting Diode, OLED), or the like.

The user input unit 107 may be configured to receive entered number or character information, and generate key signal input related to user settings and function control of the electronic device. Optionally, the user input unit 107 includes a touch panel 1071 and another input device 1072. The touch panel 1071, also called a touch screen, may collect touch operation on or near the touch panel by users (for example, operation on the touch panel 1071 or near the touch panel 1071 by fingers or any suitable objects or accessories such as a touch pen by the users). The touch panel 1071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented as a resistive type, a capacitive type, an infrared type, a surface acoustic wave type, or the like. In addition to the touch panel 1071, the user input unit 107 may further include another input device 1072. Optionally, another input device 1072 may include but is not limited to: a physical keyboard, a function key (such as a volume control key, a switch key), a trackball, a mouse, and a joystick, which is no longer repeated here.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 9, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 108 is an interface for connecting an external apparatus and the electronic device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 can be configured to receive input from an external apparatus (for example, data information and power) and transmit the received input to one or more elements in the electronic device 100, or can be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 109 may include a high-speed random access memory or a nonvolatile memory, for example, at least one disk storage device, a flash memory, or other volatile solid-state storage devices.

The processor 110 is a control center of the electronic device and connects all parts of the electronic device using various interfaces and circuits. By running or executing software programs and/or modules stored in the memory 109 and by calling data stored in the memory 109, the processor 110 implements various functions of the electronic device and processes data, thus performing overall monitoring on the electronic device. The processor 110 may include one or more processing units. Optionally, an application processor and a modem processor may be integrated into the processor 110. The application processor mainly processes an operating system, a user interface, an application, and the like. The modem processor mainly processes wireless communication. It may be understood that the above-mentioned modem processor may not be integrated in the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some functional modules not shown. Details are not described herein again.

Optionally, the embodiments of the present disclosure further provide an electronic device, including a processor 110 shown in FIG. 9, a memory 109, and a computer program stored in the memory 109 and executable on the processor 110. When the computer program is executed by the processor 110, the processes of the foregoing method embodiment are implemented, and a same technical effect can be achieved. To avoid repetition, details are not described herein again.

Embodiments of the present disclosure further provide a computer-readable storage medium. The computer-readable storage medium stores a computer program. The computer program implements, when executed by a processor, each process of the foregoing method embodiments, and a same technical effect can be achieved. To avoid repetition, details are not described herein again. The computer-readable storage medium is a read-only memory (Read-Only Memory, ROM), a random access memory (Random Access Memory, RAM), a magnetic disk, an optical disc, or the like.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. Without more restrictions, an element defined by the statement "including a . . . " does not exclude another same element in this process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An image processing method, performed by an electronic device, wherein the electronic device comprises a body, a first camera, and a second camera, and the method comprises:
    in a case that the electronic device is in a first movement state, capturing a first image through the first camera, wherein the first camera moves relative to the body;
    displaying the first image on a shooting preview interface; and in a case that the electronic device changes from the first movement state to a stationary state, processing a second image and updating the first image on the shooting preview interface to the processed second image, wherein the second image is an image captured by the second camera in a case that the electronic device is in the stationary state, and the second camera is stationary relative to the body.

2. The method according to claim 1, wherein before the processing a second image, the method further comprises:
obtaining a target parameter, wherein the target parameter is used to indicate a position and posture relationship of the second camera relative to the first camera; and
determining a perspective transformation matrix according to the first image and the second image, wherein the perspective transformation matrix is used to indicate a shift relationship of the second image relative to the first image; and
the processing a second image comprises:
processing the second image according to the target parameter and the perspective transformation matrix.

3. The method according to claim 2, wherein the obtaining a target parameter comprises:
obtaining a first parameter and a second parameter, wherein the first parameter is an internal parameter and an external parameter of the first camera, and the second parameter is an internal parameter and an external parameter of the second camera; and
determining the target parameter based on the first parameter and the second parameter.

4. The method according to claim 1, wherein before the capturing a first image through the first camera, the method further comprises:
determining a target shift of the first camera according to a target displacement of the electronic device; and
controlling the first camera to move according to the target shift; and
the capturing a first image through the first camera comprises:
capturing the first image through the first camera that has moved.

5. The method according to claim 1, wherein after the updating the first image on the shooting preview interface to the processed second image, the method further comprises:
in a case that the electronic device changes from the stationary state to a second movement state, updating the second image on the shooting preview interface to a third image, wherein the third image is an image captured by the first camera in the second movement state.

6. An electronic device, comprising a processor, a memory, and a computer program stored in the memory and executable on the processor, wherein when the computer program is executed by the processor, the steps of an image processing method are implemented, wherein the method comprises:
in a case that the electronic device is in a first movement state, capturing a first image through the first camera, wherein the first camera moves relative to the body;
displaying the first image on a shooting preview interface; and
in a case that the electronic device changes from the first movement state to a stationary state, processing a second image and updating the first image on the shooting preview interface to the processed second image, wherein the second image is an image captured by the second camera in a case that the electronic device is in the stationary state, and the second camera is stationary relative to the body.

7. The electronic device according to claim 6, wherein before the processing a second image, wherein when the computer program is executed by the processor, the processor further implements:
obtaining a target parameter, wherein the target parameter is used to indicate a position and posture relationship of the second camera relative to the first camera; and
determining a perspective transformation matrix according to the first image and the second image, wherein the perspective transformation matrix is used to indicate a shift relationship of the second image relative to the first image; and
the processing a second image comprises:
processing the second image according to the target parameter and the perspective transformation matrix.

8. The electronic device according to claim 7, wherein the obtaining a target parameter comprises:
obtaining a first parameter and a second parameter, wherein the first parameter is an internal parameter and an external parameter of the first camera, and the second parameter is an internal parameter and an external parameter of the second camera; and
determining the target parameter based on the first parameter and the second parameter.

9. The electronic device according claim 6, wherein before the capturing a first image through the first camera, wherein when the computer program is executed by the processor, the processor further implements:
determining a target shift of the first camera according to a target displacement of the electronic device; and
controlling the first camera to move according to the target shift; and
the capturing a first image through the first camera comprises:
capturing the first image through the first camera that has moved.

10. The electronic device according to claim 6, wherein after the updating the first image on the shooting preview interface to the processed second image, wherein when the computer program is executed by the processor, the processor further implements:
in a case that the electronic device changes from the stationary state to a second movement state, updating the second image on the shooting preview interface to a third image, wherein the third image is an image captured by the first camera in the second movement state.

11. A non-transitory computer-readable storage medium, wherein the computer-readable storage medium stores a computer program, and when the computer program is executed by a processor, the steps of an image processing method are implemented, wherein the method comprises:
in a case that the electronic device is in a first movement state, capturing a first image through the first camera, wherein the first camera moves relative to the body;
displaying the first image on a shooting preview interface; and
in a case that the electronic device changes from the first movement state to a stationary state, processing a second image and updating the first image on the shooting preview interface to the processed second image, wherein the second image is an image captured by the second camera in a case that the electronic device is in the stationary state, and the second camera is stationary relative to the body.

12. The non-transitory computer-readable storage according to claim 11, wherein before the processing a second image, wherein when the computer program is executed by the processor, the processor further implements:
- obtaining a target parameter, wherein the target parameter is used to indicate a position and posture relationship of the second camera relative to the first camera; and
- determining a perspective transformation matrix according to the first image and the second image, wherein the perspective transformation matrix is used to indicate a shift relationship of the second image relative to the first image; and
- the processing a second image comprises:
- processing the second image according to the target parameter and the perspective transformation matrix.

13. The non-transitory computer-readable storage according to claim 12, wherein the obtaining a target parameter comprises:
- obtaining a first parameter and a second parameter, wherein the first parameter is an internal parameter and an external parameter of the first camera, and the second parameter is an internal parameter and an external parameter of the second camera; and
- determining the target parameter based on the first parameter and the second parameter.

14. The non-transitory computer-readable storage according to claim 11, wherein before the capturing a first image through the first camera, wherein when the computer program is executed by the processor, the processor further implements:
- determining a target shift of the first camera according to a target displacement of the electronic device; and
- controlling the first camera to move according to the target shift; and
- the capturing a first image through the first camera comprises:
- capturing the first image through the first camera that has moved.

15. The non-transitory computer-readable storage according to claim 11, wherein after the updating the first image on the shooting preview interface to the processed second image, wherein when the computer program is executed by the processor, the processor further implements:
- in a case that the electronic device changes from the stationary state to a second movement state, updating the second image on the shooting preview interface to a third image, wherein the third image is an image captured by the first camera in the second movement state.

* * * * *